No. 674,617. Patented May 21, 1901.
J. W. PERRY.
TROLLEY WIRE CLIP.
(Application filed Apr. 6, 1901.)
(No Model.)
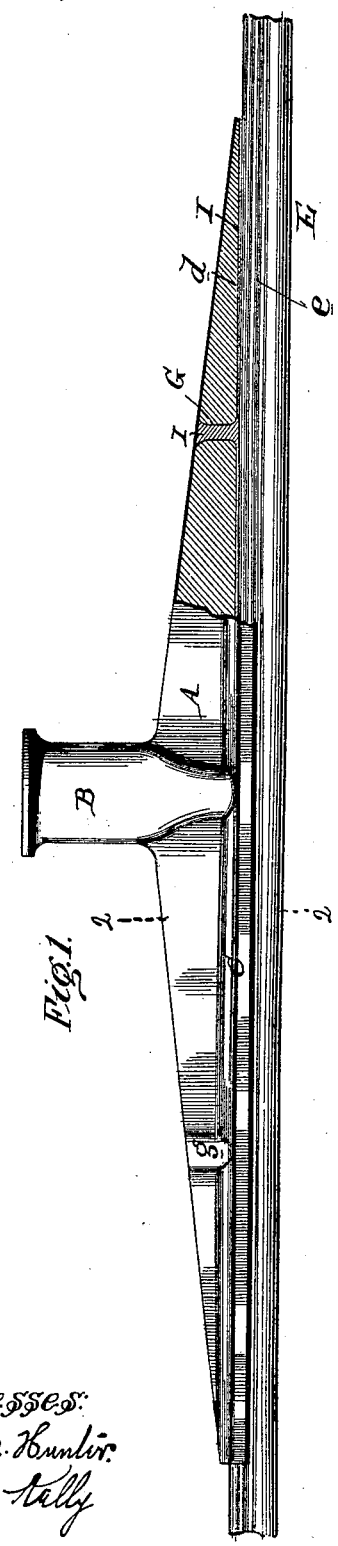
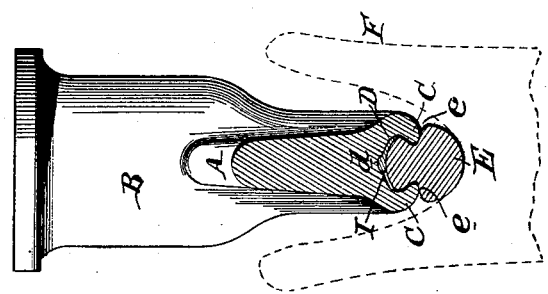
Witnesses:
Inventor:
James W. Perry

UNITED STATES PATENT OFFICE.

JAMES W. PERRY, OF PHILADELPHIA, PENNSYLVANIA, ASSIGNOR TO H. W. JOHNS MANUFACTURING COMPANY, OF NEW JERSEY.

TROLLEY-WIRE CLIP.

SPECIFICATION forming part of Letters Patent No. 674,617, dated May 21, 1901.

Application filed April 6, 1901. Serial No. 54,637. (No model.)

*To all whom it may concern:*

Be it known that I, JAMES W. PERRY, of the city and county of Philadelphia, State of Pennsylvania, have invented an Improvement in Trolley-Wire Clips, of which the following is a specification.

My invention has reference to trolley-wire clips; and it consists of certain improvements, all of which are fully set forth in the following specification and shown in the accompanying drawings, which form a part thereof.

The main object of my invention is to provide an efficient, inexpensive, and durable form of clip or hanger for a trolley-wire of the grooved type, which is becoming largely used in connection with high-speed electric railways.

My object is, further, to so form the clip and its attachment that the attachment of the clip to the wire may be speedily and economically made and the connection formed may be of the most durable kind, being both a mechanical and a soldered union.

In carrying out my invention I provide the bottom portion of the clip with a longitudinal groove, which is itself provided with lateral grooved portions to form inside ribs at the bottom, which fit into the longitudinal grooves on the sides and upper half of the grooved trolley-wire, so as to secure a mechanical connection with the wire. I further form the clip with one or more holes through the upper part down into the longitudinal groove in which the wire-body is placed, through which solder is run to perform the dual function of filling all of the unfilled space within the groove and between its walls and the trolley-wire to make a tight connection between the clip and wire, and, secondly, to form a more perfect union of the two parts by a positive soldered joint from which all heavy downward strains are removed.

My invention also comprehends minor details, all of which will be better understood by reference to the drawings, in which—

Figure 1 is a side elevation of a trolley-wire clip embodying my invention, part being shown in section; and Fig. 2 is a cross-section of same on line 2 2.

A is the body of the clip, being deepest at the middle, where it unites with the hub B for connection with the insulator and suspension devices, and tapering toward the ends, as shown. The lower portion C of the clip is thickened and grooved on the bottom, as at D, said groove being formed with side grooves or undercuts to form inwardly and downwardly projecting longitudinal ribs C. The upper part of the groove D is provided with a small channel $d$ throughout its length and communicating with the casting-apertures G, which are formed through the thickened parts $g$ of the clip and open through the clip from top to the groove D.

The trolley-wire E is of the type known as the "grooved" wire and is substantially circular in cross-section except for two longitudinal side grooves $e\ e$ in its upper half and slightly above the horizontal diameter. This trolley-wire is pressed upward into the groove D, and the side ribs C C of the clip are crimped or bent inward to fit into the grooves $e$ of the wire. In this condition the wire is mechanically suspended and for some purposes might be of sufficient strength; but to prevent longitudinal movement through the clip and to give additional strength and firmness I solder the wire in place by pouring molten solder I through the apertures G and causing it to flow along the channel $d$ and completely fill the space between the wire and walls of the groove D, as shown. This gives additional strength, especially against longitudinal movement, by the direct adhesion of the solder; but it also acts mechanically to hold the wire firmly upon the ribs C C, as before pointed out. While the longitudinal channel $d$ might be dispensed with, especially where the clearance between the wire and clip was sufficient to permit the solder to flow, I prefer to use the channel, because much less care is necessary in making the soldered joint and the solder is induced to flow freely throughout the whole length of the clip and make a strong union.

F represents the upper part of a trolley-wheel, and it will be observed that my improved slip presents no obstructions or irregularities to the trolley-wheel, thereby permitting it to travel along at great speed without liability of jar or jumping.

While I have shown my invention as applied to a simple form of clip, it is to be understood that I do not confine myself to the precise structure shown, as my invention is equally applicable to various well-known types of hangers for trolley-wires, whether they be simple clips, crossings, frogs, or switches.

Having now described my invention, what I claim as new, and desire to secure by Letters Patent, is—

1. A suspension-clip for trolley-wires having a longitudinal groove on its bottom formed with inward and downwardly projecting longitudinal ribs, and one or more apertures through the upper part of the clip and opening through the upper wall of the longitudinal groove through which solder may be poured.

2. A suspension-clip for trolley-wires having a longitudinal groove on its bottom formed with inward and downward projecting longitudinal ribs, and one or more apertures through the upper part of the clip and opening through the upper wall of the longitudinal groove through which solder may be poured in combination with a trolley-wire having longitudinal side grooves into which the side ribs of the groove of the clip are received.

3. A suspension-clip for trolley-wires having a longitudinal groove on its bottom formed with inward and downward projecting longitudinal ribs, and one or more apertures through the upper part of the clip and opening through the upper wall of the longitudinal groove through which solder may be poured in combination with a trolley-wire having longitudinal side grooves into which the side ribs of the grooves of the clip are received, and solder uniting the clip and trolley-wire and filling all the space between the walls of the groove and trolley-wire.

4. A suspension-clip for trolley-wires having a longitudinal groove in its bottom formed with inward and downwardly projecting longitudinal ribs, in combination with a trolley-wire having longitudinal side grooves into which the side ribs of the groove of the clip are received, and solder uniting the clip and trolley-wire and filling all the space between the walls of the groove and trolley-wire.

5. A trolley-wire suspension-clip formed with a longitudinal groove on its bottom the upper wall of which is provided with a channel having one or more apertures leading to the outside and the lower part of the side walls of the groove forming inwardly-projecting ribs.

6. A trolley-wire suspension-clip formed with a longitudinal groove on its bottom the upper wall of which is provided with a channel having one or more apertures leading to the outside and the lower part of the side walls of the groove forming inwardly-projecting ribs in combination with a trolley-wire having its sides provided with longitudinal grooves into which the ribs of the clip fit, and solder uniting the wire and clip filling the channel and groove between said wire and clip.

In testimony of which invention I hereunto set my hand.

JAMES W. PERRY.

Witnesses:
R. M. HUNTER,
R. M. KELLY.